United States Patent [19]
Weber

[11] Patent Number: 6,122,620
[45] Date of Patent: Sep. 19, 2000

[54] SYSTEM FOR THE RADIO TRANSMISSION OF REAL-TIME AIRLINE FLIGHT INFORMATION

[75] Inventor: Christopher Scott Weber, Arlington, Tex.

[73] Assignee: Sabre Inc., Ft. Worth, Tex.

[21] Appl. No.: 08/911,641

[22] Filed: Aug. 15, 1997

Related U.S. Application Data

[60] Provisional application No. 60/038,884, Feb. 20, 1997.

[51] Int. Cl.[7] ........................................... G06F 17/60
[52] U.S. Cl. .............................. 705/6; 705/5; 347/825.26; 347/825.28
[58] Field of Search ....................... 705/5–6; 347/825.26, 347/825.28; 340/539, 905; 455/67.1, 404, 515

[56] References Cited

PUBLICATIONS

"Net risks pay off for Hyatt Hotels, state of Iowa", Network World, vol. 11, No. 47, Nov. 21, 1994.

Bitran et al., "An application of yield management to the Hotel industry considering multiple day stays", vol. 43, No. 3, May–Jun. 1995.

*Primary Examiner*—Frantzy Poinvil
*Attorney, Agent, or Firm*—Finnegan, Henderson, Farabow, Garrett & Dunner LLP

[57] ABSTRACT

A flight delivery system that utilizes an architectural structure and network that allows real-time digital signals to be stored, retrieved and converted to an audio signal for radio transmission to achieve nearly instantaneous transmission of real-time data. The system, utilizes a computerized reservation system as a source of information and stores it on a database. The information is called up by a computer that converts the data to a digital audio signal. The digital audio signal is then broadcast over airport antennae. The system features programs that allow for a conversion from airport city codes to the common identification for local cities.

8 Claims, 3 Drawing Sheets

SYSTEM FOR THE RADIO TRANSMISSION OF REAL-TIME AIRLINE FLIGHT INFORMATION

This application claims benefit of Provisional Application Ser. No. 60/038,884 filed Feb. 20, 1997.

TECHNICAL FIELD OF THE INVENTION

The present invention relates to an improved information delivery system and, more specifically, to an architecture and network that allows real time digital signals to be stored, retrieved and converted to an audio signal for radio transmission to achieve the nearly instantaneous transmission of real-time data.

BACKGROUND OF THE INVENTION

Without limiting the scope of the invention, the present invention relates to a network for gathering data and translating the data into a user-friendly format for transmission over a user-friendly medium. In such networks, emphasis is heavily placed on the accuracy of the information, the timeliness in the delivery of the information and the mode of the delivery of the information.

In the field pertaining to this invention, the transmitted data is airline flight arrival and departure information. In the history of scheduled passenger air transportation, it has always been a goal to get flight arrival and departure information to the public in as an efficient method as possible. In the beginning days of scheduled passenger flight, this information was generally delivered by voice and written word. Passengers would call or, if at the airport, ask an agent of the airline the time of departure or arrival of a particular flight. The information would be available either by the spoken word or a sign located within the confines of an airport.

Since that time and continuing to today, the passenger still gets the information the same way. Through the spoken word or through the written word. What has changed tremendously is the way the information is gathered and distributed. In the early days, the scheduling information was set by the airline and then distributed in schedule books.

This prior system did not address scheduling changes that occurred after the schedule book was printed. Changes could occur for any number of reasons, including delays due to weather, mechanical problems or because of changes in an airline's overall flight system.

The passengers would not be made aware of these changes until they entered the airport. The duty to inform the passengers fell to the agent at the airport. Overall, the prior manual system was a very inefficient system.

As time went on, technology began to introduce changes in the way information was gathered and distributed. With the advent of the Semi-Automated Business Research Environment (SABRE), airlines began to have a tool at their disposal that allowed them to gather information more efficiently. Today, SABRE, a computerized reservation service (CRS), and other CRS', such as Covia, Worldspan and Apollo, collect and disburse information regarding not only passenger reservation information but also flight information. These CRS' enable information to be more timely disbursed over a wide geographic area almost instantaneously. Today that geographic area includes the entire world.

Today's methods of conveying the scheduled flight information to passengers, include automated telephone flight information services, e-mail, facsimile, use of television screens at airports along with public address systems at individual gates. There are video monitors placed inside the airport structures. Airports also have public address systems that are used to announce the most timely of information, flight cancellations, gate changes, explanations for other nonscheduled events. Large signs have been erected at some airports that provide flight information to people entering the airports. These signs have diminished value during inclement weather because visibility is poor, making it difficult for the visiting airport person to read.

Accordingly, today there are various overlays of ways flight information is delivered to the airport visitor.

In the case of various large airports where there may be more than one airport terminal, an improved system for providing flight information prior to entering the airport facilities is needed.

The instant invention gathers flight information from a variety of sources, both human and computer, and converts it to a user-friendly audio signal, then transmits it to the airport visitor's automobile via radio frequencies for reception in the airport visitor's automobile. In this way, real-time information is delivered timely, accurately and in a user-friendly medium. Radio reception is not affected by weather conditions except in the most extreme of conditions. Therefore, the airport visitor has the information needed to determine where they need to go to either take or meet a flight. The radio signal is strong enough that it will reach the airport visitor's automobile prior to arriving at the airport in most instances, further providing ease of use.

SUMMARY OF THE INVENTION

The present invention is an improved flight information collection and delivery system that provides real-time information in a user-friendly format. The invention offers the advantage of delivering real-time information to the airport visitor prior to entering the airport terminal in a way that is timely, accurate and largely independent of environmental factors.

It is a primary advantage of the present invention to provide real-time flight information to airport visitors. This is accomplished by connecting input from a variety of sources to a virtual network. As information is gathered about a specific flight, it is fed through a network to a computerized network. The information may include expected time of arrival, departure times, flight number, gate information, etc. The computer network is a computerized reservation system (CRS). The flight information is gathered by the CRS as part of its normal operations. It is converted into a computer language that allows it to be processed by the computer and then used to do a variety of functions, including scheduling flights, assigning crews, keeping updated information on weather, etc.

The present invention takes this raw data in its computer language form and retrieves arrival and departure information. It should be noted that this information is the most current and comprehensive information that can be obtained about a particular flight. This information is taken from the CRS and stored on a file server. A personal computer, p.c., then accesses the file server on a periodic basis. It takes the information, retrieves and transmits it to a second p.c. that converts the computer language into a form that permits audio reception on radios. The signal is broadcast via a radio transmitter to the airport visitor. In this way, the airport visitor receives the most current information in a convenient and timely manner.

Another advantage of this invention is that the system will reboot itself, without human intervention and the reboot will be virtually invisible to the ultimate user. By utilizing a particular memory location and placing a bit where one was not before, the system will automatically recognize when the bit is missing. The bite will be missing when the system is not receiving information from the data storage on the file server. Monitoring the location is a background task. The background task will read that that location is empty and force a hard reading.

For a more complete understanding of the present invention, including its features and advantages, reference is now made to the following detailed description, taken in conjunction with the accompanying drawings.

DETAILED DESCRIPTION OF THE INVENTION

In the following detailed description, a user shall mean and encompass a single user, a plurality of users or anyone of a plurality of users. The word "user" shall be used to mean anyone using an airport facility. Also, a node shall be understood to mean an entry point into a network, a network element, server or other designated point of access. Other similar connotations shall be obvious to those skilled in the art upon reference to this disclosure.

Figure 1:
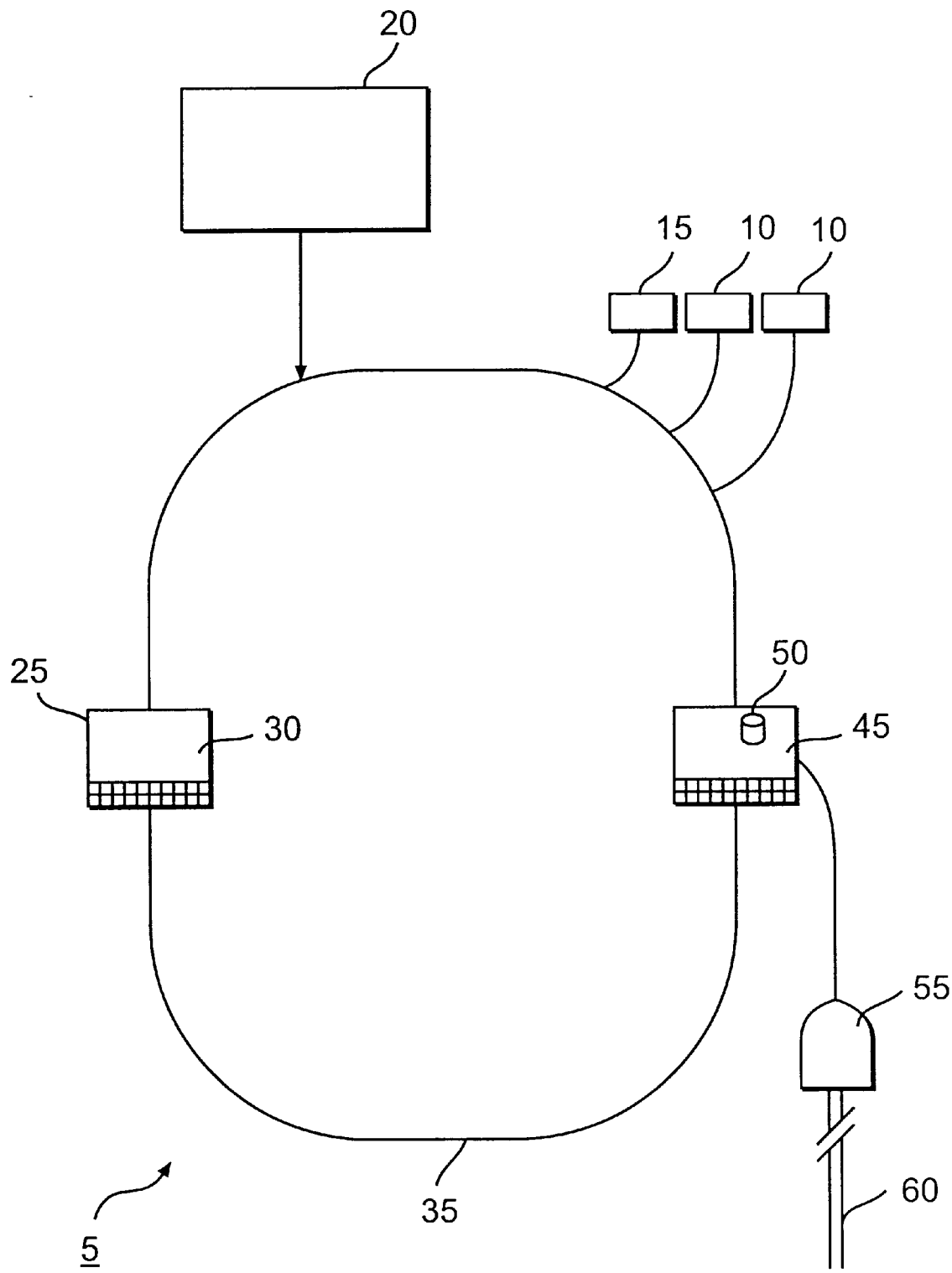
FIG. 1 is a high level block diagram of a network according to one aspect of this invention.

In FIG. 1, the flight information network is shown and generally denoted as 5. Flight information network 5 is a network connected to a variety of flight information sources. The information enters through various nodes. The nodes consist of output monitors 10, printers 15, computerized reservation system (CRS) 20, and a file server 25 having a database 30. The output monitors 10 are used to output information regarding flight arrivals and departures at various locations from around the world. The flight information is sent to CRS 20 from various sources where it is stored and then transmitted out to the nodes. This information is received at an airport local area network LAN 35.

The information stored in the CRS 20 is delivered to the airport LAN 35 where it is then disbursed to various nodes. These nodes may include the monitors 10, the printers 15 and other output devices.

The present invention is a part of, and accesses, the LAN 35 to retrieve the information it needs to broadcast to the airport visitor. As previously mentioned, the LAN 35 also has a database 30 as part of a file server 25. The database 30 also captures the flight information received from the CRS 20 and culls it out from the other information. The information is held here until it is called up by personal computer 45. It is the role of personal computer 45 to receive flight information from the file server 25. Personal computer 45 takes the information retrieved from the file server 25 and converts it to an audio wave file. In the present invention, this is a typical audio wave file as developed by Microsoft. In this process, the soundblaster is initialized. The core of this function is called playwave. It first initializes the soundblaster. Then in the next step it allocates memory to receive the header information. It checks to make sure the digital signal processor is present and functioning properly. The playwave function calls all subsequent functions to the header file to read the wave. The timing loop is also set during this time. The time is set in the file server 25 from input from the CRS 20.

Figure 2:
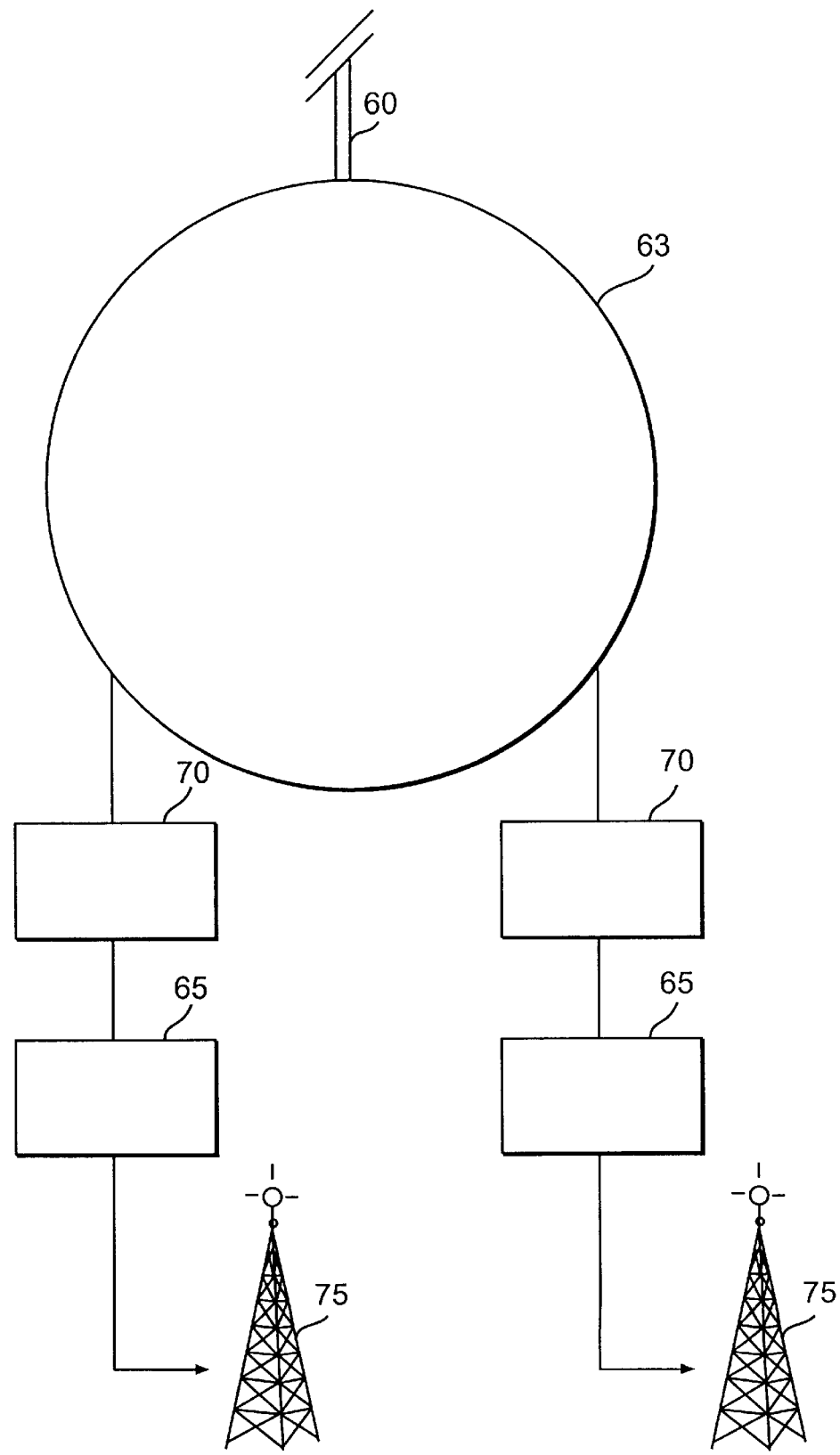
FIG. 2 is a high level block diagram of the equipment that receives the data through to the transmission.

In FIG. 2, a high level block diagram of the equipment that receives the data is shown. Personal computer 45 is configured with a digital signal processor, DSP, which is 100% soundblaster compatible 16, version 4.0 or greater, with a 16 bit DMA access. Such a DSP is manufactured by Creative Labs. It is available royalty free over the Internet and needs slight customization for use with the invention. The necessary modifications are obvious to one skilled in the art.

The database 30 has a spelling disk 50 associated with it. Each airport has a separate and distinct city code associated with it. For example, the airport located between Dallas and Fort Worth is identified by the city code DFW. The city code of the airport at Fresno is FAT. The city code for Chicago's O'HARE field is ORD. Accordingly, one of the things the program must do is to translate the airport name from the city code into an audio wave file the name of the city that is recognizable to the user.

To do this a spelling disk 50 is associated with the local personal computer 45. The spelling disk uses a routine that automatically translates from city code to user language. A separate routine is required for this because the system needs to be able to differentiate between similar city names. For example, when the city San Jose is mentioned, one needs to know if this is San Jose, Calif. or San Jose, Costa Rica. Another example would be Monterrey, Calif. and Monterrey, Nuevo Leon, Mexico.

The same logistics encountered with the real time automated voice response system for flight information occurs here with this system. A person having ordinary skill in the art would be familiar with the work necessary to handle all the nuances that are associated with changing city codes to audible city names. Listed below is the table that is used to convert city code to audible city names.

| ABE | Allentown-Bethlehem |
|-----|---------------------|
| ABI | Abilene |
| ABQ | Albuquerque |
| ACA | Acapulco |
| ACK | Nantucket, MA |
| ACT | Waco |
| ACV | Eureka Arcata CA |
| AEX | Alexandria LA |
| AFW | Alliance-Afw |
| AGP | Malaga |
| AKL | Auckland, New Zealand |
| ALB | Albany |
| ALO | Waterloo |
| AMA | Amarillo |
| ANC | Anchorage |
| ANU | Antigua |
| APF | Naples FL |
| ARN | Stockholm |
| ASE | Aspen |
| ASU | Asuncion |
| ATL | Atlanta |
| AUA | Aruba |
| AUH | Abu Dhabi |
| AUS | Austin |
| AVL | Asheville |
| AXA | Anguilla |
| AZO | Kalamazoo |
| BAH | Bahrain, Bahrain |

-continued

| | |
|---|---|
| BAQ | Barranquilla |
| BDA | Bermuda |
| BDL | Hartford-Springfield |
| BFL | Bakersfield |
| BGI | Barbados |
| BHM | Birmingham AL |
| BHX | Birmingham UK |
| BJX | Leon Mexico |
| BMI | Bloomington IL |
| BNA | Nashville |
| BOG | Bogota, Colombia |
| BOI | Boise, Idaho |
| BOS | Boston |
| BPT | Beaumont-Port Arthur |
| BQK | Brunswick GA |
| BQN | Aguadilla PR |
| BRL | Burlington IA |
| BRU | Brussels, Belgium |
| BTR | Baton Rouge |
| BUD | Budapest, Hungary |
| BUF | Buffalo |
| BUR | Burbank |
| BWI | Baltimore-Washington |
| BZE | Belize City, Belize |
| CAE | Columbia SC |
| CAK | Akron-Canton |
| CCS | Caracas |
| CGH | Sao Paulo, Brazil |
| CHA | Chattanooga |
| CHS | Charleston SC |
| CIC | Chico CA |
| CID | Cedar Rapids-Iowa City |
| CKB | Clarksburg WV |
| CLD | Carlsbad CA |
| CLE | Cleveland |
| CLL | College Station |
| CLO | Cali, Colombia |
| CLT | Charlotte NC |
| CMH | Columbus OH |
| CMI | Champaign-Urbana |
| CNF | Belo Horizonte Brazil |
| COS | Colorado Springs |
| CPT | Cape Town |
| CRP | Corpus Christi |
| CSG | Columbus GA |
| CUN | Cancun |
| CUR | Curacao, Netherland Anti |
| CUU | Chihuahua, Mexico |
| CVG | Cincinnati |
| CWA | Wausau-Stevens Pt |
| CZM | Cozumel |
| DAB | Daytona Beach |
| DAY | Dayton |
| DBQ | Dubuque |
| DCA | Washington-National |
| DEC | Decatur IL |
| DEN | Denver |
| DFW | Dallas-Ft Worth |
| DOH | Doha, Qatar |
| DOM | Dominica |
| DRO | Durango Colorado |
| DSM | Des Moines |
| DTW | Detroit |
| DUS | Dusseldorf |
| EGE | Vail CO |
| EIS | Tortola Beef Island |
| ELP | El Paso |
| ESF | Alexandria |
| EUG | Eugene OR |
| EVV | Evansville IN |
| EWN | New Bern NC |
| EWR | Newark |
| EYW | Key West |
| EZE | Buenos Aires, Argentina |
| FAI | Fairbanks |
| FAR | Fargo |
| FAT | Fresno |
| FAY | Fayetteville NC |
| FDF | Fort De France |
| FLL | Ft Lauderdale |
| FLO | Florence SC |
| FMN | Farmington NM |
| FMY | Fort Myers |
| FNT | Flint |
| FPO | Freeport, Bahamas |
| FRA | Frankfurt, Germany |
| FSD | Sioux Falls |
| FSM | Ft Smith |
| FTW | Fort Worth |
| FWA | Ft Wayne |
| FYV | Fayetteville AR |
| GCM | Grand Cayman |
| GDL | Guadalajara, Mexico |
| GEO | Georgetown, Guyana |
| GGG | Longview-Kilgore |
| GGT | George Town |
| GHB | Governors Hrbr |
| GIG | Rio De Janeiro |
| GLA | Glasgow UK |
| GLS | Galveston, Texas |
| GND | Grenada |
| GPT | Gulfport Biloxi |
| GRB | Green Bay |
| GRR | Grand Rapids |
| GRU | Sao Paulo, Brazil |
| GSO | Greensboro |
| GSP | Greenville-Spartanburg |
| GSW | Ft.worth-Great Southwest |
| GTR | Columbus-Starkville |
| GUA | Guatemala City |
| GUC | Gunnison |
| GYE | Guayaquil, Ecuador |
| HDN | Steamboat Springs |
| HDQ | Test City |
| HEL | Helsinki, Finland |
| HHH | Hilton Head |
| HKY | Hickory NC |
| HNL | Honolulu |
| HOU | Houston-Hobby |
| HPN | Westchester Cty |
| HRL | Harlingen |
| HSV | Huntsville |
| HUF | Terre Haute |
| HUX | Huatulco MX |
| IAD | Washington-Dulles |
| IAH | Houston Intercontinental |
| ICT | Wichita |
| IDA | Idaho Falls |
| IFP | Laughlin-Bullhead City |
| ILE | Killeen |
| ILM | Wilmington NC |
| IND | Indianapolis |
| INT | Winston-Salem |
| ISP | Long Island MacArthur |
| IYK | Inyokern CA |
| JAC | Jackson Hole |
| JAN | Jackson MS |
| JAX | Jacksonville |
| JFK | New York-JFK |
| JNB | Johannesburg |
| JXN | Jackson MI |
| KIN | Kingston, Jamaica |
| LAF | Lafayette IN |
| LAN | Lansing |
| LAS | Las Vegas |
| LAW | Lawton |
| LAX | Los Angeles |
| LBB | Lubbock |
| LCH | Lake Charles |
| LEX | Lexington |
| LFT | Lafayette LA |
| LGA | New York-LGA |
| LGB | Long Beach |
| LGW | London-LGW |
| LHR | London-LHR |
| LIM | Lima, Peru |
| LIT | Little Rock |
| LMT | Klamath Falls |

-continued

| | |
|---|---|
| LPB | La Paz, Bolivia |
| LRD | Laredo |
| LRM | Casa De Campo-LRM |
| LSE | Lacrosse-Winona |
| LYH | Lynchburga VA |
| MAD | Madrid, Spain |
| MAF | Midland-Odessa |
| MAN | Manchester UK |
| MAR | Maracaibo |
| MAZ | Mayaguez, PR |
| MBJ | Montego Bay, Jamaica |
| MBS | Saginaw |
| MCE | Merced CA |
| MCI | Kansas City |
| MCO | Orlando |
| MCT | Muscat Oman |
| MDT | Harrisburg |
| MDW | Chicago-Midway |
| MEI | Meridian MS |
| MEL | Melbourne, Australia |
| MEM | Memphis |
| MEX | Mexico City |
| MFE | McAllen |
| MFR | Medford Oregon |
| MGA | Managua, Nicaragua |
| MGM | Montgomery |
| MHH | Marsh Harbor, Bahamas |
| MIA | Miami |
| MIE | Muncie |
| MKE | Milwaukee |
| MKG | Muskegon MI |
| MLB | Melbourne FL |
| MLI | Moline IL |
| MLU | Monroe |
| MOB | Mobile |
| MOD | Modesto CA |
| MQT | Marquette |
| MRY | Monterey CA |
| MSN | Madison WI |
| MSP | Minneapolis-St Paul |
| MSY | New Orleans |
| MTH | Marathon FL |
| MTY | Monterrey, Mexico |
| MUC | Munich, Germany |
| MVD | Montevideo, Uruguay |
| MWX | Mosstown Bahamas |
| MXP | Milan, Italy |
| MYR | Myrtle Beach |
| NAP | Naples FL |
| NAS | Nassau, Bahamas |
| NRT | Tokyo-Narita |
| OAJ | Jacksonville NC |
| OAK | Oakland |
| OGG | Kahului Maui |
| OKC | Oklahoma City |
| OMA | Omaha |
| ONT | Ontario CA |
| ORD | Chicago |
| ORF | Norfolk |
| ORY | Paris, France |
| OWB | Owensboro KY |
| OXR | Oxnard |
| PAH | Paducah KY |
| PAP | Port Au Prince |
| PBI | West Palm Beach |
| PDX | Portland OR |
| PGV | Greenville NC |
| PHF | Newport News |
| PHL | Philadelphia |
| PHX | Phoenix |
| PIA | Peoria |
| PIE | St Petersburg |
| PIT | Pittsburgh |
| PLS | Providenciales, Turks |
| PNS | Pensacola |
| POP | Puerto Plata, DR |
| POS | Port Of Spain, Trinidad |
| POU | Poughkeepsie |
| PRX | Paris, TX |
| PSE | Ponce, Pr |
| PSP | Palm Springs |
| PTP | Pointe A Pitre |
| PTY | Panama City |
| PUJ | Punta Cana, Dr |
| PVD | Providence |
| PVR | Puerto Vallarta |
| RDD | Redding |
| RDM | Redmond OR |
| RDU | Raleigh-Durham |
| RFD | Rockford IL |
| RIC | Richmond |
| RNO | Reno |
| ROA | Roanoke |
| ROC | Rochester NY |
| RST | Rochester MN |
| RSW | Fort Myers |
| SAL | San Salvador |
| SAN | San Diego |
| SAP | San Pedro Sula |
| SAT | San Antonio |
| SAV | Savannah |
| SBA | Santa Barbara |
| SBN | South Bend |
| SBP | San Luis Obispo |
| SCC | Deadhorse-Prudhoe Bay AK |
| SCK | Stockton CA |
| SCL | Santiago, Chile |
| SCQ | Sntiago D Cmpst |
| SDF | Louisville |
| SDQ | Santo Domingo |
| SEA | Seattle-Tacoma |
| SEL | Seoul, Korea |
| SFB | Sanford FL |
| SFO | San Francisco |
| SGF | Springfield MO |
| SHV | Shreveport |
| SID | Cape Verde Is |
| SIN | Singapore |
| SJC | San Jose, California |
| SJD | Los Cabos |
| SJO | San Jose, Costa Rica |
| SJT | San Angelo |
| SJU | San Juan |
| SKB | St Kitts |
| SLC | Salt Lake City |
| SLU | St Lucia |
| SMF | Sacramento |
| SMX | Santa Maria |
| SNA | Orange County |
| SPI | Springfield IL |
| SPS | Wichita Falls |
| SRQ | Sarasota |
| STL | St Louis |
| STS | Santa Rosa, CA |
| STT | St Thomas, USVI |
| STX | St Croix, USVI |
| SUX | Sioux City IA |
| SVD | St Vincent |
| SVO | Moscow, Russia |
| SWF | Newburgh Stewart |
| SXM | St Maarten |
| SYD | Sydney, Australia |
| SYR | Syracuse |
| TAM | Tampico |
| TCB | Treasure Cay |
| TCL | Tuscaloosa |
| TFS | Tenerife |
| TGU | Tegucigalpa |
| TLH | Tallahassee FL |
| TOL | Toledo |
| TPA | Tampa |
| TPL | Temple TX |
| TSS | MidtownManhattan |
| TUL | Tulsa |
| TUS | Tucson |
| TVC | Traverse City |
| TXK | Texarkana |
| TXL | Berlin |

-continued

| | |
|---|---|
| TYR | Tyler |
| TYS | Knoxville |
| UIO | Quito, Ecuador |
| UVF | St Lucia |
| VIJ | Virgin Gorda |
| VIS | Visalia |
| VLN | Valencia |
| VPS | Ft Walton Beach |
| VRB | Vero Beach, Fl |
| VVI | Santa Cruz, Bolivia |
| WAW | Warsaw |
| YEG | Edmonton |
| YHM | Hamilton, Canada |
| YHZ | Halifax |
| YOW | Ottawa |
| YQB | Quebec City |
| VPS | Ft Walton Beach |
| VRB | Vero Beach, Fl |
| VVI | Santa Cruz, Bolivia |
| WAW | Warsaw |
| YEG | Edmonton |
| YHM | Hamilton, Canada |
| YHZ | Halifax |
| YOW | Ottawa |
| YQB | Quebec City |
| YUL | Montreal |
| YVR | Vancouver BC |
| YWG | Winnipeg MB |
| YYC | Calgary |
| YYZ | Toronto |
| ZIH | Zihuatanejo |
| ZRH | Zurich, Switzerland |
| ZRK | Rockford IL |
| ZSA | San Salvador BH |

The CRS 20 retrieves, stores and dispatches information about every matter concerning a flight. This information includes all take offs and landings. They are reported through the CRS 20 and then the information is dispensed throughout the system. The flight information is retrieved and stored into a database 30. This information is, in turn, be called up for use by the file server 25 in response to periodic requests from personal computer 45.

Because a large amount of information is received from the CRS 20, other information above and beyond arrival and departure times may also be retrieved. These enhancements would include other airline information. For example, the present invention may be used to identify not only the flight arrival time, but also the airline for which the craft is flying.

In another embodiment the present invention may have a continuous loop that periodically repeats the identity of the airline for whom the flight information is being provided.

All of this information is fed into the personal computer 45 where, as stated previously, a wave file is called up to translate the information from machine language into a user-friendly format.

From the personal computer 45, the information is transmitted to an audio plug 55 The audio plug 55 goes directly to a regular telephone circuit 60. The audio plug connects personal computer 45 with the airport network. The circuit may be a dedicated line or part of a vertical network. In the preferred embodiment, it is a part of a dedicated line.

The telephone circuit goes out to an airport LAN 63 shown at FIG. 2. The airport LAN 63 includes a radio transmitter 65 located at the airport. In the preferred embodiment the radio transmitter is a 60 watt transmitter with a broadcast radius of 10 miles. The broadcast is received on a user's radio and the user then audibly hears pertinent information regarding flight arrival and departure.

Figure 3:
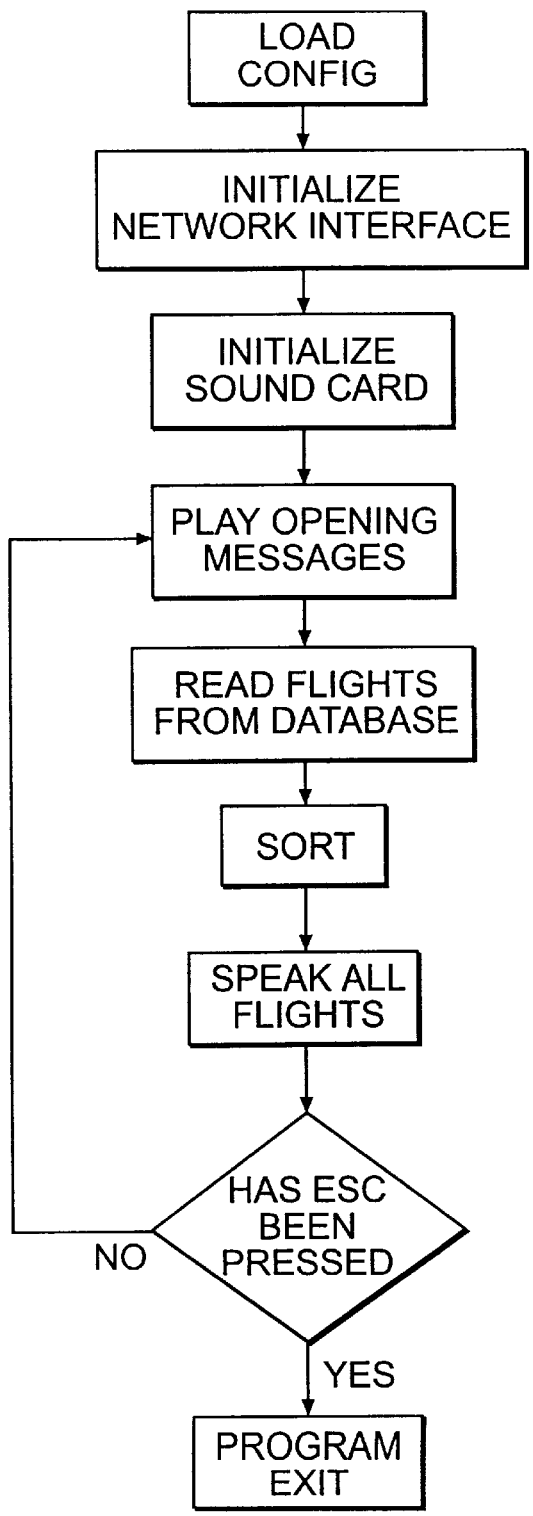
FIG. 3 is a high level block flow chart of the steps the system undertakes to present the information.

FIG. 3 is a high level flow chart showing the steps of the software program. In general, the program first loads the software configuration. Then it looks for and connects to the network. From the network, the software locates the file server and transfers flight information into half of a buffer. At the same time, it initializes the soundblaster and wave files and DMA. Next, it sets up the wave file and DSP. The information is then converted to an audio format and then sent to the airport LAN 63 to be sent to an equalizer 70. From the equalizer 70, the information is sent to a transmitter 65 and from there out through airport antennaes 75.

A copy of the source code follows. It is an embodiment of the invention but the invention should not be limited to this code. It is provided as an example.

```
/* FILE:   DMAW.C   Original copyright pasted back
in... */
/*************************************************
*************
*
* FILE : DMAW.C  ver 1.01  (Aug 15, 94)
*
* Copyright (C) 1994-96 Creative Technology.
*
* DMA DEMO PROGRAM FOR PLAYING WAVE FILES
*
* PURPOSE:   This program demonstrates how to play a .wav file
*            using DMA auto-init mode.
*
* LIMITATION : This program does not support 8 bit STEREO for SBPro.
*
*            16 bit files must use the SB16.
*
* DISCLAIMER : Although this program has been tested with
*              standard 8/16 bit PCM WAVE files, there
```

```
         could
         *       exist some unknown bugs.
         *
         * THIS CODE AND INFORMATION IS PROVIDED "AS IS" WITHOUT
 5       WARRANTY OF ANY
         * KIND, EITHER EXPRESSED OR IMPLIED, INCLUDING BUT NOT
         LIMITED TO THE
         * IMPLIED WARRANTIES OF MERCHANTABILITY AND/OR FITNESS FOR
         A PARTICULAR
10       * PURPOSE.
         *
         * You have a royalty-free right to use, modify, reproduce
         and
         * distribute the Sample Files (and/or any modified version)
15       in
         * any way you find useful, provided that you agree that
         * Creative has no warranty obligations or liability for any
         Samples Files.
         *
20       ***********************************************************
         *************/
```

```
/************************************
I have modified this code to remove some Creative Labs
Specific limitations
and allow easy repeated use, as needed for our project
- Scott
*****************************************/ include <dos.h>
include <memory.h>
#include <stdio.h>
include <stdlib.h> define DMA_BUF_SIZE    8192
define DMA8_FF_REG     0xC
#define DMA8_MASK_REG   0xA
#define DMA8_MODE_REG   0xB
#define DMA16_FF_REG    0xD8
#define DMA16_MASK_REG  0xD4
define DMA16_MODE_REG  0xD6 define DMA0_ADDR       0
define DMA0_COUNT      1
```

```
     #define DMA0_PAGE    0x87
     #define DMA1_ADDR    2
     #define DMA1_COUNT   3
     #define DMA1_PAGE    0x83
 5   #define DMA3_ADDR    6
     #define DMA3_COUNT   7
     #define DMA3_PAGE    0x82
     #define DMA5_ADDR    0xC4
     #define DMA5_COUNT   0xC6
10   #define DMA5_PAGE    0x8B
     #define DMA6_ADDR    0xC8
     #define DMA6_COUNT   0xCA
     #define DMA6_PAGE    0x89
     #define DMA7_ADDR    0xCC
15   #define DMA7_COUNT   0xCE
     #define DMA7_PAGE    0x8A define DSP_BLOCK_SIZE         0x0048
     #define DSP_DATA_AVAIL         0xE
20   #define DSP_HALT_SINGLE_CYCLE_DMA 0x00D0
     #define DSP_READ_PORT          0xA
     #define DSP_READY              0xAA
```

23

```
#define DSP_RESET           0x6
#define DSP_TIME_CONSTANT   0x0040
#define DSP_WRITE_PORT      0xC
define DSP_VERSION         0xE1 define AUTO_INIT           1
define FAIL                0
#define FALSE               0
#define MASTER_VOLUME       0x22
#define MIC_VOLUME          0x0A
#define MIXER_ADDR          0x4
#define MIXER_DATA          0x5
#define MONO                0
#define PIC_END_OF_INT      0x20
#define PIC_MASK            0x21
#define PIC_MODE            0x20
#define SUCCESS             1
#define SINGLE_CYCLE        0
#define STEREO              1
#define TRUE                1
#define VOICE_VOLUME        0x04
```

```c
struct WAVEHDR{
    char         format[4];      // RIFF
    unsigned long  f_len;         // filelength
    char         wave_fmt[8];    // WAVEfmt_
    unsigned long  fmt_len;       // format lenght
    unsigned short fmt_tag;       // format Tag
    unsigned short channel;       // Mono/Stereo
    unsigned long  samples_per_sec;
    unsigned long  avg_bytes_per_sec;
    unsigned short blk_align;
    unsigned short bits_per_sample;
    char         data[4];        // data
    unsigned long  data_len;      // data size
} wavehdr;
```

```c
/*--------- FUNCTION PROTOTYPES --------------------------
------*/
/*--------------------------------------------------------
------*/
char    GetBlasterEnv(int *, int *, int *),
        InitDMADSP(unsigned long, int, int),
```

```
                ResetDSP(int);

unsigned int   FillHalfOfBuffer(int *, FILE *, unsigned char

*);

unsigned long  AllocateDMABuffer(unsigned char **),

OnSamePage(unsigned char *);

void    Play(unsigned int, char),
        DSPOut(int, int),
        Fill_play_buf(unsigned char *, int *, FILE *),
        SetMixer(void);

void interrupt DMAOutputISR(void);   // Interrupt Service
Routine int     Chk_hdr(FILE *);
/*-----------------------------------------------------
------*/

/*--------- GLOBAL DECLARATIONS -------------------------
------*/
```

```
/*----------------------------------------------------------
------*/
char  gBufNowPlaying,
         gEndOfFile,
         gLastBufferDonePlaying,
         Mode,     // indicates MONO or STEREO
         g16BitDMA;

int   Base,
         DSP_Ver;
char SecondToLastBufferPlayed;
unsigned long gNoOfBytesLeftInFile;

void (_interrupt _far *IRQSave)();

unsigned char *DMABuffer;
  unsigned int   BytesLeftToPlay;
  unsigned long  BufPhysAddr;

int   DMAChan8Bit,
         DMAChan16Bit,
```

IRQNumber;

```
    int init_sb_stuff(void) {
5   int RetValue;
    BufPhysAddr = AllocateDMABuffer(&DMABuffer);
    if (BufPhysAddr == FAIL)
    {
      puts("DMA Buffer allocation failed!--PROGRAM ABORTED");
10    exit(0);
    }

RetValue = GetBlasterEnv(&DMAChan8Bit, &DMAChan16Bit,
    &IRQNumber);
15  if (RetValue == FAIL)
    {
      puts("BLASTER env. string or parameter(s) missing--
    PROGRAM ABORTED!");
      free(DMABuffer);
20    exit(0);
    }
```

```
        if(ResetDSP(Base) == FAIL)

{ puts("Unable to reset DSP chip--PROGRAM TERMINATED!");

free(DMABuffer);

5         exit(0);

} return 0;

}

10    int sb_close(void) { free(DMABuffer);

return 0;

}

15

/*--- BEGIN main() ---------------------------------------

------*/

/*--------------------------------------------------------

------*/

20    int playwav(char *filename) {

FILE *FileToPlay;
```

```
        int BufToFill, IRQMask, MaskSave;
    //  unsigned long gNoOfBytesLeftInFile;

SecondToLastBufferPlayed = FALSE;
5       gBufNowPlaying = gEndOfFile =
            gLastBufferDonePlaying = Mode = g16BitDMA = 0;

/*--- OPEN FILE TO BE PLAYED ----------------------------
        --*/
10      /*-------------------------------------------------------
        --*/
            if ((FileToPlay = fopen(filename, "rb")) == NULL)
        return -1;

15      /*--- VERIFY FILE IS .WAV FORMAT-------------------------
        -*/
        /*-------------------------------------------------------
        -*/
            if(Chk_hdr(FileToPlay)) {
20              printf("Header check error - PROGRAM ABORTED");
                return -1;
            }
```

```
          Mode = (wavehdr.channel == 1) ? MONO : STEREO;

/*--- PRINT OUT INFO ------------------------------------
          ------
5 printf("   DMA Buffer Address    = %4x:%-4x (SEG:OFF)
      (hex)\n",
              FP_SEG(DMABuffer), FP_OFF(DMABuffer));
          printf("   DMA Buffer Phys. Addr. = %-7lu  (decimal)\n",
10     BufPhysAddr);
          printf("   8-bit DMA channel     = %-5d
      (decimal)\n",  DMAChan8Bit);
          printf("   16-bit DMA channel    = %-5d
      (decimal)\n",  DMAChan16Bit);
15        printf("   I/O port address      = %-3x     (hex)\n",
      Base);
          printf("   IRQ number            = %-2d
      (decimal)\n\n", IRQNumber);
          *************************************************************
20     ***/ if((DSP_Ver < 4) && (wavehdr.bits_per_sample == 16)) {
```

```
        fclose(FileToPlay);

return -1;

}

5
        IRQSave = _dos_getvect((unsigned)(IRQNumber + 8));

_dos_setvect(IRQNumber + 8, DMAOutputISR);

/*--- SAVE CURRENT INTERRUPT MASK AND SET NEW INTERRUPT
10      MASK -------*/

/*-------------------------------------------------

----------*/

MaskSave = inp((int) PIC_MASK);

IRQMask = ((int) 1 << IRQNumber); // Shift a 1 left
15      IRQNumber of bits outp(PIC_MASK, (MaskSave & ~IRQMask)); // Enable previous
        AND new interrupts

/*--- PROGRAM THE DMA, DSP CHIPS ------------------------
20      ----------*/

/*-------------------------------------------------

----------*/
```

32

```
        if (InitDMADSP(BufPhysAddr, DMAChan8Bit, DMAChan16Bit) ==
     FAIL) {
        puts("InitDMADSP() fails--PROGRAM ABORTED!");
        fclose(FileToPlay);
 5      exit(0);
        }

/*--- FILL THE FIRST 1/2 OF DMA BUFFER BEFORE PLAYING
        BEGINS -------*/
10      /*-----------------------------------------------------
        ----------*/
        BufToFill          = 0;     // Altered by
     FillHalfOfBuffer()
        gEndOfFile         = FALSE; // Altered by
15   FillHalfOfBuffer()
        gBufNowPlaying     = 0;     // Altered by ISR
        gLastBufferDonePlaying = FALSE;  // Set in ISR
        gNoOfBytesLeftInFile  = wavehdr.data_len;
        SetMixer();
20
        BytesLeftToPlay = FillHalfOfBuffer(&BufToFill, FileToPlay,
     DMABuffer);
```

33

```
          /*--- BEGIN PLAYING THE FILE ----------------------------

----------*/

/*--------------------------------------------------------

----------*/

5         if (wavehdr.data_len < DMA_BUF_SIZE / 2)  // File size is

< 1/2 buffer size.

{

Play(BytesLeftToPlay, SINGLE_CYCLE);

10            while (gBufNowPlaying == 0);  // Wait for playing to finish (ISR called)

} else  // File size >= 1/2 buffer size

{

15
              Play(BytesLeftToPlay, AUTO_INIT);

Fill_play_buf(DMABuffer, &BufToFill, FileToPlay);

}

20        DSPOut(Base, DSP_HALT_SINGLE_CYCLE_DMA);  // Done playing, halt DMA
```

```
/*--- RESTORE ISR AND ORIGINAL IRQ VECTOR ----------------
---------*/
/*--------------------------------------------------------
---------*/
    outp(PIC_MASK, MaskSave);
    _dos_setvect((unsigned)(IRQNumber + 8), IRQSave);

fclose(FileToPlay);
    return(0);
}

/***********************************************************
**********
*
* FUNCTION : Chk_hdr()
*
* DESCRIPTION : check for validity of the wave file header
*
************************************************************
***********/
```

```
int Chk_hdr(FILE * FileToPlay)

{ char * dummy[80];

5   memset (&wavehdr,0,sizeof(wavehdr));  //init to 0 fread(&wavehdr, 44, 1, FileToPlay);  // Get file type
    description.

if (memcmp(wavehdr.format, "RIFF", 4)) return -1;
10  if (memcmp(wavehdr.wave_fmt, "WAVEfmt ", 8)) return -1;
    if (!((wavehdr.channel == 1) || (wavehdr.channel == 2)))
    return -1;
    if (memcmp(wavehdr.data, "data", 4)) {
      if (memcmp(wavehdr.data, "fact", 4)) return -1;
15 while(wavehdr.data_len) {
        fread(dummy,(int) (wavehdr.data_len%80), 1,
    FileToPlay);  // Get file type description.
        wavehdr.data_len -= wavehdr.data_len%80;
20    }
      fread(wavehdr.data, 8, 1, FileToPlay);
      if (memcmp(wavehdr.data, "data", 4)) return -1;
```

36

```
        } return 0;

} /* chk_hdr() */

/***********************************************************
*************
*
* FUNCTION: Play()
*
* DESCRIPTION : Sets up playing of the wave file depending
on number
*       of bits per sample, MONO/STEREO and DMAMode
*
***********************************************************
************/
void Play(unsigned int BytesLeftToPlay, char DMAMode)
{

/*--- IF BytesLeftToPlay IS 0 OR 1, MAKE SURE THAT WHEN
```

```
         DSPOut() IS ---*/

/*--- CALLED, THE COUNT DOESN'T WRAP AROUND TO A + NUMBER

WHEN 1 IS ---*/

/*   SUBTRACTED! -------------------------------------
5        -------------*/ if(BytesLeftToPlay <= 1 && g16BitDMA)

BytesLeftToPlay = 2;

else if (BytesLeftToPlay == 0 && !g16BitDMA)

BytesLeftToPlay = 1;
10 if(DSP_Ver < 4) // SBPro (DSP ver 3.xx)

{ if(wavehdr.bits_per_sample == 8)

{
15         if (DMAMode == AUTO_INIT)

{

DSPOut(Base, DSP_BLOCK_SIZE);

DSPOut(Base, (int) ((BytesLeftToPlay - 1) & 0x00FF));

DSPOut(Base, (int) ((BytesLeftToPlay - 1) >> 8));
20         DSPOut(Base, 0x001C);  // AUTO INIT 8bit PCM

} else
```

```
    {
      DSPOut(Base, 0x0014);  // SINGLE CYCLE 8bit PCM
      DSPOut(Base, (BytesLeftToPlay - 1) & 0x00FF);  // LO
byte size
      DSPOut(Base, (BytesLeftToPlay - 1) >> 8);     // HI
byte size
    }
  }
  else if (wavehdr.bits_per_sample == 16) // 16Bit
  {
    DSPOut(Base, 0x0041);
    DSPOut(Base, (int) ((wavehdr.samples_per_sec &
0x0000FF00) >> 8));
    DSPOut(Base, (int) (wavehdr.samples_per_sec &
0x000000FF));
    DSPOut(Base, (DMAMode == AUTO_INIT) ? 0x00B4 :
0x00B0);  // AUTO INIT/SINGLE
CYCLE
    DSPOut(Base, (Mode == MONO) ? 0x0010 : 0x0030);  //
MONO/STEREO
    DSPOut(Base, (BytesLeftToPlay/2 - 1) & 0x00FF);    //
LO byte size
```

```
            DSPOut(Base, (BytesLeftToPlay/2 - 1) >> 8);    //
   HI byte size
      }
      }
5     else if(DSP_Ver == 4)// SB16 (DSP ver 4.xx)
      {
          DSPOut(Base, 0x0041);  // DSP output transfer rate
          DSPOut(Base, (int) ((wavehdr.samples_per_sec &
   0x0000FF00) >> 8));  // Hi byte
10        DSPOut(Base, (int) (wavehdr.samples_per_sec &
   0x000000FF));      // Lo byte if (DMAMode == AUTO_INIT)
              DSPOut(Base, (wavehdr.bits_per_sample == 8) ? 0x00C6 :
15    0x00B6);  // AUTO INIT 8/16 bit
          else
              DSPOut(Base, (wavehdr.bits_per_sample == 8) ? 0x00C0 :
   0x00B0);  // SINGLE CYCLE 8/16
   bit
20
          if (wavehdr.bits_per_sample == 8)
              DSPOut(Base, (Mode == MONO) ? 0x0000 : 0x0020); //
```

40

8bit MONO/STEREO else

DSPOut(Base, (Mode == MONO) ? 0x0010 : 0x0030); //
16bit MONO/STEREO

/*--- Program number of samples to play ------------------
--------------*/

DSPOut(Base, (int)
((BytesLeftToPlay/(wavehdr.bits_per_sample/8) - 1) &
0x00FF)); // LO byte DSPOut(Base, (int)
((BytesLeftToPlay/(wavehdr.bits_per_sample/8) - 1) >> 8));
// HI byte

} return;
}

/*************************************************************
*
* FUNCTION: Fill_play_buf()

```
         *
         * DESCRIPTION : Keeps the DMA buffers filled with new data
         until end of
         *      file.
    5    *
         ***********************************************************
         ************/
         void Fill_play_buf(unsigned char *DMABuffer, int *BufToFill,
         FILE *FileToPlay)
   10    {
           unsigned int NumberOfAudioBytesInBuffer;

do
           {
   15        while (*BufToFill == gBufNowPlaying); // Wait for buffer
         to finish playing NumberOfAudioBytesInBuffer = FillHalfOfBuffer(BufToFill,
         FileToPlay,
   20                    DMABuffer);
             if (NumberOfAudioBytesInBuffer < DMA_BUF_SIZE / 2)
             Play(NumberOfAudioBytesInBuffer, SINGLE_CYCLE);
```

```
        } while (!gEndOfFile);  // gEndOfFile set in
FillHalfOfBuffer()

while (gLastBufferDonePlaying == FALSE); // Wait until
5    done playing return;
    }

10  /*****************************************************
    *************
    *
    * FUNCTION: FillHalfOfBuffer()
    *
15  * DESCRIPTION : Fill each half of the DMA buffer.
    *
    *****************************************************
    ************/
    unsigned int FillHalfOfBuffer(int *BufToFill, FILE
20  *FileToPlay,
              unsigned char *DMABuffer)
    {
```

```
         unsigned int Count;

if (*BufToFill == 1)   // Fill top 1/2 of DMA buffer
             DMABuffer += DMA_BUF_SIZE / 2;
5 if(gNoOfBytesLeftInFile < DMA_BUF_SIZE/2)
         {
             fread(DMABuffer,(int) gNoOfBytesLeftInFile, 1,
         FileToPlay);
10           Count = (int) gNoOfBytesLeftInFile;
             gNoOfBytesLeftInFile = 0;
             gEndOfFile = TRUE;
         }
         else
15       {
             fread(DMABuffer, DMA_BUF_SIZE/2, 1, FileToPlay);
             Count = DMA_BUF_SIZE/2;
             gNoOfBytesLeftInFile -= DMA_BUF_SIZE/2;
         }
20

*BufToFill ^= 1;   // Toggle to fill other 1/2 of buffer
``` next time.

```
  return(Count);

}
```

```c
/************************************************
************
*
* FUNCTION: DMAOutputISR()
*
* DESCRIPTION: Interrupt service routine.  Every time the DSP chip finishes
*              playing half of the DMA buffer in auto-init mode, an
*              interrupt is generated, which invokes this routine.
*
************************************************
************/
void interrupt DMAOutputISR(void)
{
```

```
      int IntStatus;

if (g16BitDMA == TRUE)
      {
5        outp(Base + 4, 0x82);    // Select interrupt status
      reg. in mixer
         IntStatus = inp(Base + 5);  // Read interrupt status
      reg.

10       if (IntStatus & 2)
            inp(Base + 0xF);   // Acknowledge interrupt (16-bit)
      }
      else
         inp(Base + (int) DSP_DATA_AVAIL);  // Acknowledge
15    interrupt (8-bit)

gBufNowPlaying ^= 1;

outp(PIC_MODE, (int) PIC_END_OF_INT); // End of interrupt
20
      if (SecondToLastBufferPlayed)
         gLastBufferDonePlaying = TRUE;
```

46

```
       if (gEndOfFile)

SecondToLastBufferPlayed = TRUE;

return;

5    }

/*************************************************

*************

10   *

* FUNCTION: InitDMADSP()

*

* DESCRIPTION: This function reads the first data block of the file and

15   *       from it obtains information that is needed to program the

*       DMA and DSP chips.  After reading the data block, the file

*       pointer points to the first byte of the voice 20   data.

*

*       NOTE: The DMA chip is ALWAYS programmed for
```

```
                auto-init mode
        *       (command 0x58)!  The DSP chip will be
        programmed for
        *       auto-init or single-cycle mode
    5   depending upon
        *       conditions--see Play() for details.
        *
        ***********************************************************
        ************/
   10   char InitDMADSP(unsigned long BufPhysAddr, int DMAChan8Bit,
        int DMAChan16Bit)
        { int DMAAddr,
   15        DMACount,
             DMAPage,
             Offset,
             Page,
             Temp;
   20
            unsigned char ByteTimeConstant;
```

```
      /*--- GET DMA ADDR., COUNT, AND PAGE FOR THE DMA CHANNEL

USED ----------*/

/*------------------------------------------------------

5    --------------*/ if (wavehdr.bits_per_sample == 8)

{ g16BitDMA = FALSE; // DMA is not 16-bit (it's 8-bit).

10       switch(DMAChan8Bit)   // File is 8-bit. Program DMA 8- bit DMA channel

{ case 0:

DMAAddr  = DMA0_ADDR;

15         DMACount = DMA0_COUNT;

DMAPage  = DMA0_PAGE;

break;

case 1:

20         DMAAddr  = DMA1_ADDR;

DMACount = DMA1_COUNT;

DMAPage  = DMA1_PAGE;
```

```
                break;

case 3:

DMAAddr  = DMA3_ADDR;

5               DMACount = DMA3_COUNT;

DMAPage  = DMA3_PAGE;

break;

default:

10
                return(FAIL);

}
        }
        else
15      {
            g16BitDMA = TRUE;    // DMA is 16-bit (not 8-bit).

switch(DMAChan16Bit) // File is 16-bit.  Program DMA 16-
            bit DMA channel 20          {
            case 5:

DMAAddr  = DMA5_ADDR;
```

```
            DMACount = DMA5_COUNT;

DMAPage = DMA5_PAGE;

break;

5           case 6:

DMAAddr = DMA6_ADDR;

DMACount = DMA6_COUNT;

DMAPage = DMA6_PAGE;

break;

10
            case 7:

DMAAddr = DMA7_ADDR;

DMACount = DMA7_COUNT;

DMAPage = DMA7_PAGE;

15            break;

default:

return(FAIL);

20          }

DMAChan16Bit -= 4; // Convert
```

}

```
/*--- PROGRAM THE DMA CHIP ------------------------------
            --------------*/
/*------------------------------------------------------
--------------*/
    Page   = (int) (BufPhysAddr >> 16);
    Offset = (int) (BufPhysAddr & 0xFFFF);

if (wavehdr.bits_per_sample == 8) // 8-bit file--Program 8-bit DMA controller
    {
        outp(DMA8_MASK_REG, (int) (DMAChan8Bit | 4));    // Disable DMA while prog.
        outp(DMA8_FF_REG,   (int) 0);                     // Clear the flip-flop outp(DMA8_MODE_REG, (int) (DMAChan8Bit | 0x58)); // 8-bit auto-init
        outp(DMACount, (int) ((DMA_BUF_SIZE - 1) & 0xFF)); // LO byte of count
```

```
                outp(DMACount, (int) ((DMA_BUF_SIZE - 1) >> 8));   // HI
        byte of count
            }
            else   // 16-bit file--Program 16-bit DMA controller
 5          {
                // Offset for 16-bit DMA channel must be calculated
        differently...
                // Shift Offset 1 bit right, then copy LSB of Page to
        MSB of Offset.
10              Temp = Page & 0x0001;   // Get LSB of Page and...
                Temp <<= 15;            // ...move it to MSB of Temp.
                Offset >>= 1;           // Divide Offset by 2
                Offset &= 0x7FFF;       // Clear MSB of Offset
                Offset |= Temp;         // Put LSB of Page into MSB of
15      Offset outp(DMA16_MASK_REG, (int) (DMAChan16Bit | 4));   //
        Disable DMA while prog.
                outp(DMA16_FF_REG,   (int) 0);                    //
20      Clear the flip-flop outp(DMA16_MODE_REG, (int) (DMAChan16Bit | 0x58));   //
```

53

16-bit auto-init outp(DMACount, (int) ((DMA_BUF_SIZE/2 - 1) & 0xFF)); // LO byte of count outp(DMACount, (int) ((DMA_BUF_SIZE/2 - 1) >> 8));   // HI byte of count

} outp(DMAPage, Page);          // Physical page number outp(DMAAddr, (int) (Offset & 0xFF)); // LO byte address of buffer outp(DMAAddr, (int) (Offset >> 8));   // HI byte address of buffer // Done programming the DMA, enable it if (wavehdr.bits_per_sample == 8)

outp(DMA8_MASK_REG, DMAChan8Bit);

else outp(DMA16_MASK_REG, DMAChan16Bit);

```
     /*--- PROGRAM THE DSP CHIP ------------------------------

-----------*/

/*---------------------------------------------------------

-----------*/

5    if(DSP_Ver < 4)

{

ByteTimeConstant = (unsigned char) (256 -

1000000L/wavehdr.samples_per_sec);

DSPOut(Base, (int) DSP_TIME_CONSTANT);

10   DSPOut(Base, (int) ByteTimeConstant);

}

DSPOut(Base, 0x00D1);  // Must turn speaker ON before doing D/A conv.

15 return(SUCCESS);

}

20   /*************************************************

*************

*
```

* FUNCTION: AllocateDMABuffer()

*

* DESCRIPTION : Allocate memory for the DMA buffer.  After memory is

5    *         allocated for the buffer, call OnSamePage() to verify

*         that the entire buffer is located on the same page.

*         If the buffer crosses a page boundary, 10   allocate another

*         buffer. Continue this process until the DMA buffer resides

*         entirely within the same page.

*

15   * ENTRY: **DMABuffer is the address of the pointer that will point to

*     the memory allocated.

*

* EXIT: If a buffer is succesfully allocated, *DMABuffer 20   will point to

*     the buffer and the physical address of the buffer pointer will

```
 *     be returned.
 *
 *     If a buffer is NOT successfully allocated, return
FAIL.
 *
 ************************************************************
 ************/
unsigned long AllocateDMABuffer(unsigned char **DMABuffer)
{
    unsigned char  BufferNotAllocated = TRUE,
        Done = FALSE,
        *PtrAllocated[100];

int     i,
        Index = 0;

unsigned long  PhysAddress;

do
    {
        *DMABuffer = (unsigned char *) malloc(DMA_BUF_SIZE);
```

```
        if (*DMABuffer != NULL)
        {
        /*--- Save the ptr for every malloc() performed ---*/
        PtrAllocated[Index] = *DMABuffer;
5       Index++;

/*--- If entire buffer is within one page, we're out
        of here! ---*/
        PhysAddress = OnSamePage(*DMABuffer);
10      if (PhysAddress != FAIL)
            {
            BufferNotAllocated = FALSE;
            Done = TRUE;
            }
15      }
        else
            Done = TRUE;  // malloc() couldn't supply requested
        memory 20      } while (!Done);
```

```
        if (BufferNotAllocated)

{

Index++;        // Incr. Index so most recent
        malloc() gets free()d

PhysAddress = FAIL;  // return FAIL

}

/*--- Deallocate all memory blocks crossing a page
     boundary ---*/ for (i= 0; i < Index - 1; i++)

free(PtrAllocated[i]);

return(PhysAddress);

}

/******************************************************
   **************

*

* FUNCTION: OnSamePage()

*

* DESCRIPTION: Check the memory block pointed to by the
```

```
     parameter
*        passed to make sure the entire block of
memory is on the
*        same page.  If a buffer DOES cross a page
boundary,
*        return FAIL.  Otherwise, return the physical
address
*        of the beginning of the DMA buffer.
*
* ENTRY: *DMABuffer - Points to beginning of DMA buffer.
*
* EXIT: If the buffer is located entirely within one page,
return the
*      physical address of the buffer pointer.  Otherwise
return FAIL.
*
***********************************************************
*************/
unsigned long OnSamePage(unsigned char *DMABuffer)
{
    unsigned long BegBuffer,
        EndBuffer,
```

```
        PhysAddress;

/*----- Obtain the physical address of DMABuffer -----*/

BegBuffer = ((unsigned long) (FP_SEG(DMABuffer)) << 4) +
5              (unsigned long) FP_OFF(DMABuffer);

EndBuffer  = BegBuffer + DMA_BUF_SIZE - 1;

PhysAddress = BegBuffer;

/*-- Get page numbers for start and end of DMA buffer. --
10      */

BegBuffer >>= 16;

EndBuffer >>= 16;

if (BegBuffer == EndBuffer)
15        return(PhysAddress);  // Entire buffer IS on same page!

return(FAIL); // Entire buffer NOT on same page.  Thanks
        Intel!

}

20
        /*********************************************************
        **************
```

```
*
* FUNCTION: GetBlasterEnv()
*
* DESCRIPTION : Get the BLASTER environment variable and
search its
*       string for the DMA channel, I/O address
port, and
*       IRQ number.  Assign these values to the
parameters passed
*       by the caller.
*
* ENTRY: All parameters passed are pointers to integers.
They will be
*       assigned the values found in the environment
string.
*
* EXIT: If DMA channel, I/O address, and IRQ number are
found, return
*       PASS, otherwise return FAIL.
*
*
****************************************************
```

```
*************/
char GetBlasterEnv(int *DMAChan8Bit, int *DMAChan16Bit, int
*IRQNumber)
{
    char Buffer[5],
        DMAChannelNotFound = TRUE,
            *EnvString,
        IOPortNotFound    = TRUE,
        IRQNotFound       = TRUE,
        SaveChar;

int  digit,
         i,
         multiplier;

EnvString = getenv("BLASTER");

if (EnvString == NULL)
        return(FAIL);

do
```

```
        {
          switch(*EnvString)
          {
            case 'A': // I/O base port address found
 5          case 'a':
            EnvString++;
            for (i = 0; i < 3; i++)  // Grab the digits
            {
              Buffer[i] = *EnvString;
10            EnvString++;
            }

// The string is in HEX, convert it to decimal
            multiplier = 1;
15          Base = 0;
            for (i -= 1; i >= 0; i--)
            {
              // Convert to HEX
              if (Buffer[i] >= '0' && Buffer[i] <= '9')
20              digit = Buffer[i] - '0';
              else if (Buffer[i] >= 'A' && Buffer[i] <= 'F')
                digit = Buffer[i] - 'A' + 10;
```

```
       else if (Buffer[i] >= 'a' && Buffer[i] <= 'f')
         digit = Buffer[i] - 'a' + 10;

Base = Base + digit * multiplier;
 5     multiplier *= 16;
       }

IOPortNotFound = FALSE;
       break;

10 case 'D': // 8-bit DMA channel
       case 'd':
       case 'H': // 16-bit DMA channel
15     case 'h':
       SaveChar = *EnvString;
       EnvString++;
       Buffer[0] = *EnvString;
       EnvString++;
20
       if (*EnvString >= '0' && *EnvString <= '9')
         {
```

```
        Buffer[1] = *EnvString; // DMA Channel No. is 2 digits
        Buffer[2] = 0;
        EnvString++;
     }
5    else
        Buffer[1] = 0;    // DMA Channel No. is 1 digit if (SaveChar == 'D' || SaveChar == 'd')
        *DMAChan8Bit = atoi(Buffer);  // 8-Bit DMA channel
10   else
        *DMAChan16Bit = atoi(Buffer);  // 16-bit DMA channel
     DMAChannelNotFound = FALSE;
       break;

15   case 'I':  // IRQ number
     case 'i':
     EnvString++;
     Buffer[0] = *EnvString;
     EnvString++;
20
     if (*EnvString >= '0' && *EnvString <= '9')
     {
```

```
                Buffer[1] = *EnvString; // IRQ No. is 2 digits

Buffer[2] = 0;

EnvString++;

}
5           else

Buffer[1] = 0;      // IRQ No. is 1 digit

*IRQNumber = atoi(Buffer);

10          IRQNotFound = FALSE;

break;

default:

EnvString++;

15            break;

}

} while (*EnvString != 0);

20      if (DMAChannelNotFound || IOPortNotFound || IRQNotFound)

return(FAIL);
```

```
        return(SUCCESS);
    }

5   /*************************************************
    *************
    *
    * FUNCTION: DSPOut()
    *
10  * DESCRIPTION: Writes the value passed to this function to
    the DSP chip.
    *
    ************************************************************
    ************/
15  void DSPOut(int IOBasePort, int WriteValue)
    {
        // Wait until DSP is ready before writing the command
        while ((inp(IOBasePort + DSP_WRITE_PORT) & 0x80) != 0);

20      outp(IOBasePort + DSP_WRITE_PORT, WriteValue);
        return;
    }
```

```
/*************************************************
  *************
  *
5 * FUNCTION: ResetDSP()
  *
  * DESCRIPTION: Self explanatory
  *
  *************************************************
10 ************/
  char ResetDSP(int IOBasePort)
  { outp(IOBasePort + DSP_RESET, (int) 1);
15   inp(IOBasePort + DSP_RESET);
     inp(IOBasePort + DSP_RESET);
     inp(IOBasePort + DSP_RESET);
     inp(IOBasePort + DSP_RESET);
     inp(IOBasePort + DSP_RESET);
20   inp(IOBasePort + DSP_RESET);
     inp(IOBasePort + DSP_RESET);
     inp(IOBasePort + DSP_RESET);
```

```
       //  delay(10); // wait 10 mS outp(IOBasePort + DSP_RESET, (int) 0);

// Wait until data is available 5     while ((inp(IOBasePort + DSP_DATA_AVAIL) & 0x80) == 0);

if (inp(IOBasePort + DSP_READ_PORT) == DSP_READY)

{ outp(IOBasePort + DSP_WRITE_PORT, DSP_VERSION);

10        while ((inp(IOBasePort + DSP_DATA_AVAIL) & 0x80) == 0);

DSP_Ver = inp(IOBasePort + DSP_READ_PORT);

inp(IOBasePort + DSP_READ_PORT);

return(SUCCESS);

}

15 return(FAIL);

}

20

/*************************************************************
                                   70
```

```
/**************
 *
 * FUNCTION: SetMixer()
 *
 * DESCRIPTION: Self explanatory
 *
 ************************************************************
 *************/
void SetMixer(void)
{
  outp(Base + MIXER_ADDR, (int) MIC_VOLUME);
  outp(Base + MIXER_DATA, (int) 0x00);

outp(Base + MIXER_ADDR, (int) VOICE_VOLUME);
  outp(Base + MIXER_DATA, (int) 0xFF);

outp(Base + MIXER_ADDR, (int) MASTER_VOLUME);
  outp(Base + MIXER_DATA, (int) 0xFF);

return;
}
```

```
/* FILE: File_IO.C */

/* This file handles any access to files on the network and the local drive */ include <time.h>
5      #include <sys\types.h>
       #include <sys\stat.h> include <stdio.h>
       #include <io.h>
10     #include <fcntl.h>
       #include <stdlib.h>
       #include <string.h>
       #include <conio.h>
       #include <dos.h>
15     #include <nit.h> include "sb.h"
       #include "winvista.h"

20     int max_tries;
       int hard_flag;
       int fail_status;
```

```
       void (_interrupt _far *lpfnOldISR)();

void _interrupt _far MyISRFunction(unsigned int,...);

/* NAME:        set_error_handlers()

PROGRAMMER:  Nandini Pattison - Marketing/Field Services IWS

5        PURPOSE:     Determines the routine to be called when there is a hardware error.

PARAMETERS:  None.

RETURNS:     None

NOTE:        This routine should be called right after starting 10                     an application.

*/ void set_error_handlers(void)

{

15        max_tries = 5;

lpfnOldISR = _dos_getvect((unsigned)0x24);    // Save the old vector

_dos_setvect(0x24, MyISRFunction);   // Point the vector at my ISR

}

20
       /* NAME:        release_error_handlers()

PROGRAMMER:  Nandini Pattison - Marketing/Field Services IWS
```

73

PURPOSE:    Cleans up DOS and restores it to the state it was in before we hooked the interrupt.

PARAMETERS:   None.

RETURNS:    None

5    NOTE:    This routine should be called right before leaving an application.

*/ void release_error_handlers()

10    {

_dos_setvect(0x24, lpfnOldISR);    // Put the old ISR back.

}

15

/* NAME:    void _interrupt _far MyISRFunction

PROGRAMMER:   Nandini Pattison - Marketing/Field Services IWS

PURPOSE:    Handles hardware error problems. Retries 3 times.

If the problem persists, it reboots.

20    PARAMETERS:   CPU registers.

RETURNS:    None

NOTE:    This routine should not be directly called by the

74

```
                application. It should only be used by the routine set_hardware_error().

*/ void _interrupt _far MyISRFunction( _es,_ds,_di,_si,_bp,_sp,_bx,_dx,_cx,_ax )

5         unsigned int _es;

unsigned int _ds;

unsigned int _di;

unsigned int _si;

unsigned int _bp;

10        unsigned int _sp;

unsigned int _bx;

unsigned int _dx;

unsigned int _cx;

unsigned int _ax;

15        { void ( _far *Post)(void);

if( ++hard_flag > max_tries ) { if (fail_status == ABORT) {

((void _far *)Post) = (void _far *)(unsigned long)0xFFFF0000;

20                    (*Post)();                // reboot!

} else _ax = IGNORE;

} else _ax = RETRY;
```

75

```
        }

5       void startnovell()

{

/********************************************************** int fp, try;

char filename[45];

10      struct ncbrec far *ncbptr;

char far *p;

union _REGS inregs, outregs;

struct _SREGS segregs;

poll_rx = time_rx = 0;

15 memset(masternamestg,0,sizeof(masternamestg));

memset(pollstg,0,sizeof(pollstg));

memset(netnamestg,0,sizeof(netnamestg));

sprintf(pollstg,"POLL:%s%d.%s",cfg.cty,sab.ord,cfg.appname);

20      sprintf(masternamestg,"FIDS M.%s%d",cfg.cty,sab.ord);

sprintf(netnamestg,"FIDS S.%s%d",cfg.cty,sab.ord);

p = transbuffer;
```

```
            ncbptr = &ncb;
            *********************************************************/
            /********************************************************
            SetNetWareErrorMode(0x01);
 5          SetLockMode(0x01);
            *********************************************************/
            set_error_handlers();
            /********************************************************
            sprintf(filename,"%s%s.%s",cfg.path,ARRIVNAME,cfg.cty);
10          try = 0;
            _settextposition(23,15);
            _outtext("Checking Database Files...    ");
            do {
                fp = _open(filename,O_BINARY| O_RDONLY);
15              if (fp < 0) sleep(1);
            } while ( (try++ < 5) && (fp < 0));
            if (fp < 0) {
                logwrite("Could not open file",filename,0,0);
                abandon(0);
20          }
            _read(fp,&a_header,sizeof(a_header));
            _close(fp);
```

```
        if (strncmp(a_header.cty,cfg.cty,3)) { logwrite("City Code Mismatch in database","",0,0);

_settextposition(23,15);

_outtext("This Database is not the correct city\n");

5      sleep(2);

abandon(0);

} if (a_header.version != 0x82) {

10      logwrite("Incorrect Database Version","",0,0);

_settextposition(23,15);

_outtext("Incorrect Database Version");

sleep(2);

abandon(0);

15      } do {

_settextposition(23,15);

_outtext("Netbios Communication Reset");

memset(&ncb,0,sizeof(ncb));

20      ncb.command = 0x32;

inregs.x.bx = _FP_OFF( ncbptr );

segregs.es = _FP_SEG( ncbptr );
```

78

```
        _int86x(0x5c, &inregs, &outregs, &segregs );

} while (ncb.ret);

_settextposition(23,15);

_outtext("Registering Network Name      ");

5       memset(&ncb,0,sizeof(ncb));

ncb.command = 0x36;

strcpy(ncb.name,netnamestg);

inregs.x.bx = _FP_OFF( ncbptr );

segregs.es  = _FP_SEG( ncbptr );

10      _int86x(0x5c, &inregs, &outregs, &segregs );

if (!ncb.ret) { netname = ncb.num;

memset(&ncb,0,sizeof(ncb));

ncb.command = 0x21 + 0x80;

ncb.num = netname;

15      ncb.len = 200;

ncb.off = _FP_OFF(p);

ncb.seg = _FP_SEG(p);

inregs.x.bx = _FP_OFF( ncbptr );

segregs.es  = _FP_SEG( ncbptr );

20      _int86x(0x5c, &inregs, &outregs, &segregs );

} else logwrite("Network Registration","Could not resigter name",0,0);
```

79

```
*************************************************/
} void stopnovell()
{
/***********************************************************
union _REGS inregs, outregs;
struct _SREGS segregs;
struct ncbrec far *ncbptr;
struct ncbrec ncbcancel;
struct ncbrec far *ncbcanptr;
int try;
if (ncb.cmplt) {
    do {
        _settextposition(23,15);
        _outtext("Cancel Pending Command");
        ncbcanptr = &ncbcancel;
        ncbptr = &ncb;
        memset(&ncbcancel,0,sizeof(ncbcancel));
        ncbcancel.command = 0x35;
        ncbcancel.off = _FP_OFF(ncbptr);
        ncbcancel.seg = _FP_SEG(ncbptr);
```

```
            inregs.x.bx = _FP_OFF( ncbcanptr );

segregs.es = _FP_SEG( ncbcanptr );

_int86x(0x5c, &inregs, &outregs, &segregs );

printf("Result %d",ncbcancel.ret);

5       } while ((ncbcancel.ret != 0) && (ncbcancel.ret != 0x24));

} do {

_settextposition(23,15);

_outtext("Remove Netbios Network Name");

10         memset(&ncb,0,sizeof(ncb));

ncb.command = 0x31;

strcpy(ncb.name,netnamestg);

inregs.x.bx = _FP_OFF( ncbptr );

segregs.es = _FP_SEG( ncbptr );

15         _int86x(0x5c, &inregs, &outregs, &segregs );

} while (ncb.ret);

try = 0;

do {

_settextposition(23,15);

20         _outtext("Netbios Communication Reset");

memset(&ncb,0,sizeof(ncb));

ncb.command = 0x32;
```

```
        inregs.x.bx = _FP_OFF( ncbptr );

segregs.es = _FP_SEG( ncbptr );

_int86x(0x5c, &inregs, &outregs, &segregs );

try++;

5     } while ((ncb.ret) || (try < 10));

if (try == 10) logwrite("Netbios Reset Error","",ncb.ret,0);

SetNetWareErrorMode(0x00);

SetLockMode(0x00);

***********************************************************/

10    release_error_handlers();

}

15 int check_semaphore(void) {

FILE *statfp;

struct _stat buf;

time_t curtime;

20      curtime = time(&curtime);

_stat( semaphore, &buf );

/* Check the time stamp on the "download.fil" */
```

```
        if ( abs ((int) (buf.st_mtime - curtime)) > 360) { puts("semaphore file too old");

return 0;

}

5

_stat( datafile, &buf );

/* check the time stamp on the actual datafile */ if ( abs ((int) (buf.st_mtime - curtime)) > 360) { puts("Datafile file too old");

10      return 0;

} statfp = fopen(flagfile,"w");

fputs("Hi!",statfp);

15      fclose(statfp);

return 1;

}

20  int loadcfg(void) { char buffer[80];

FILE *fp;
```

```
         char *p ;
         /***
         soundline = getenv("BLASTER");
         if (soundline == NULL) puts("Blaster environment not set");
5        */
         fp = fopen("config.cfg","r");
         if (fp == NULL) return -1;
         while (fgets(buffer,80,fp)) {
           strtok(buffer,"\n");
10         if (!strncmp(buffer,"PATH",4)) strcpy(path,&buffer[5]);
           if (!strncmp(buffer,"BADDATA",7)) strcpy(badfile,&buffer[8]);
           if (!strncmp(buffer,"DATAFILE",8)) strcpy(dataname,&buffer[9]);
           if (!strncmp(buffer,"FLAGFILE",8)) strcpy(flag,&buffer[9]);
           if (!strncmp(buffer,"SAYTIME:ON",10)) saytime = 1;
15         if (!strncmp(buffer,"CTYWAV",6)) strcpy(ctypath,&buffer[7]);
           if (!strncmp(buffer,"GATWAV",6)) strcpy(gatpath,&buffer[7]);
           if (!strncmp(buffer,"TIME",4)) advance = atoi(&buffer[5]);
           if (!strncmp(buffer,"DELAYLIMIT",10)) delaytime = atoi(&buffer[11]);
           if (!strncmp(buffer,"INTLTIME",8)) intladvance = atoi(&buffer[9]);
20         if (!strncmp(buffer,"DEADAIR",7)) strcpy(deadair,&buffer[8]);
           if (!strncmp(buffer,"GATWORD",7)) {
             strtok(buffer," ,;:");
```

84

```
            p = strtok(NULL," ,:;");

strcpy(gatephrase,p);

p = strtok(NULL,"\n, ");

if ((p != NULL) && (!strncmp(p,"EVERY",5)) ) {

5               p = strtok(NULL," :");

if (!strncmp(p,"FLIGHT",5)) gatefreq = 0;

else gatefreq = atoi(p);

} else gatefreq = 1;

}

10 if (!strncmp(buffer,"TITLE",5)) { strtok(buffer," ,;:");

p = strtok(NULL," ,:;");

15          strcpy(titlefile,p);

p = strtok(NULL,"\n, ");

if ((p != NULL) && (!strncmp(p,"EVERY",5)) ) { p = strtok(NULL," :");

if (!strncmp(p,"START",5)) titlefreq = 0;

20                  else titlefreq = atoi(p);

} else titlefreq = 25;

}
```

```
      if (!strncmp(buffer,"HEADER",6)) { strtok(buffer," ,;:");

p = strtok(NULL," ,:;");

strcpy(headerfile,p);

5      p = strtok(NULL,"\n, ");

if ((p != NULL) && (!strncmp(p,"EVERY",5)) ) { p = strtok(NULL," :");

if (!strncmp(p,"START",5)) headerfreq = 0;

else headerfreq = atoi(p);

10      } else headerfreq = 3;

}

} fclose(fp);

/*****************

15    soundline = strtok(soundline," ");

do { if (soundline[0] == 'A') sscanf(&soundline[1],"%x",&sbport);

if (soundline[0] == 'I') sbintr = atoi(&soundline[1]);

if (soundline[0] == 'D') sbdma = atoi(&soundline[1]);

20    } while (soundline = strtok(NULL," "));

printf("Port = %x, Int = %d, DMA = %d \n",sbport, sbintr, sbdma);

if ((sbport == 0) || (sbintr == 0) || (sbdma == 0) ) {
```

86

```
        puts("SB Variables not set, program aborting");

return -1;

}

5       ***************/ if (intladvance == 0) intladvance = 120;

if (advance == 0) advance = 120;

if (delaytime == 0) delaytime = 10;

return 0;

10      } void loadflights(void) { int fp1, end_window;

if ( (fp1 = open(datafile,O_BINARY | O_RDONLY)) > 0) {

15          loaded = 0;

end_window = 0;

while (read(fp1,&workrec,sizeof(workrec)) &&

(loaded < 72) &&

(!end_window || (loaded < 15) ) ) {

20              workrec.IsNonStop = 1;

end_window = installrec();

if ((workrec.CityCode2[0] != 0x20) && (workrec.CityCode2[0])) {
```

```
             workrec.IsNonStop = 0;

strcpy(workrec.CityCode1,workrec.CityCode2);

installrec();

5         }
          if ((workrec.CityCode3[0] != 0x20) && (workrec.CityCode3[0]) ){ strcpy(workrec.CityCode1,workrec.CityCode3);

installrec();

}
10     }
       close(fp1);
       loaded--;
       logwrite("Loaded Flights","Quantity",loaded+1,0);
       printf("Loaded %d Flights\n",loaded+1);
15     sortflights(arriv, loaded);
      }
  }

20
```

```
/* FILE  Player.C */
/* This file is just the call that says a single flight, after checking to be sure
   that the required WAV files are present */

5      #include <stdio.h>
       #include <io.h>
       #include <fcntl.h>
       #include <stdlib.h>
       #include <string.h>
10     #include <conio.h>
       #include <dos.h>
       #include <sys/stat.h> include "sb.h"
15     #include "winvista.h"

extern char path[40];
       extern struct tagSIGN_INFO *arriv[350];
20     struct _stat buf;
       char filename[75];
```

```
        unsigned char ca;
        unsigned short ra;
        unsigned short la;

5
        unsigned char gstring[80];
        FILE *fp;
        unsigned int major;
        unsigned int minor;
10

/*.WAV stuff */
        unsigned long rID;
        unsigned long rLen;
        unsigned long wID;
15      unsigned long fID;
        unsigned long fLen;
        unsigned long fNext;
        unsigned short wFormatTag;
        unsigned short nChannels;
20      unsigned long nSamplesPerSec;
        unsigned short nAvgBytesPerSec;
        unsigned long dID;
```

```
    unsigned long dLen;

void logwrite(char *a, char *b, int res, int blk);
    void sayflight(int count) {
5
    char cityfile[75], gatefile[75];

strcpy(cityfile,ctypath);

10  strcat(cityfile,arriv[count]->CityCode1);
    strcat(cityfile,".wav");

strcpy(gatefile,gatpath);

15  strcat(gatefile,arriv[count]->Gate);
    strcat(gatefile,".wav");

if ((titlefreq == 0) && (count == 0))  playwav(titlefile);
    else if (titlefreq != 0) {
20      if ((count % titlefreq) == 0)    playwav(titlefile);
    }
```

```
       if ((headerfreq == 0) && (count == 0)) playwav(headerfile);

else if (headerfreq != 0) { if ((count % headerfreq) == 0)   playwav(headerfile);

}

5 if (_stat(cityfile,&buf) ) { logwrite("MISSING WAV",cityfile,0,0);

printf("No WAV file for %s\n",cityfile);

return;

10     } if (_stat(gatefile,&buf)) { logwrite("MISSING WAV",gatefile,0,0);

printf("No WAV file for %s\n",gatefile);

return;

15     } playwav(cityfile);

if (gatefreq == 0)  playwav(gatephrase);

20     else if (gatefreq != 0) { if ((count % gatefreq) == 0)   playwav(gatephrase);

}
```

92 playwav(gatefile);

}

/* MASTER PROGRAM FILE : WAVE.C

5   This file has the master initialization and program loop. It also contains some misc functions          */ include <time.h> include <sys\types.h>

10  #include <sys\stat.h> include <stdio.h> include <io.h> include <fcntl.h>

15  #include <stdlib.h> include <string.h> include <conio.h> include <dos.h> include <nit.h>

20 include "sb.h"

include "winvista.h"

```c
        void wavplay_init(void);

int playwav(char *filename);

void sayflight(int count);

int init_sb_stuff(void);

5       int sb_close(void);

unsigned long _far *watchstop;

/* SIGN_INFO *arriv[350]; */ struct tagSIGN_INFO *arriv[350];

10      struct tagSIGN_INFO workrec;

typedef struct tagSIGN_INFO *ptRecords[];

typedef struct tagSIGN_INFO *fidsrecord;

int fp1;

15 int nowtime, loaded;

struct cities cty[500];

char path[40];

20      char statfile[45];

char datafile[45];

char flagfile[45];
```

```
        char dataname[15];
        char flag[15];
        char ctypath[40];
        char gatpath[40];
5
        char titlefile[40];
        int titlefreq;

char headerfile[40];
10      int headerfreq;
        char semaphore[40];
        char gatephrase[15];
        int gatefreq;
        char deadair[15];
15      char badfile[15];
        char wavfile[15];
        int advance;
        int intladvance;
        int delaytime;
20      int ctycnt;
        int saytime;
        char curtime[15];
```

```
        char day_of_month[5];

int currenthour, currentminute;

5       unsigned int SYS_DATE;

void getmem()

{ int fp, bytes_read;

int count, size_needed, records_needed;

10      struct cities city;

size_needed = sizeof(workrec);

records_needed = FLT_RECORDS;

for (count = 0; count < records_needed; count++) { if ((arriv[count] = calloc(1,size_needed)) == NULL)  printf("No Mem: %d\n",count);

15      } if ( (fp = open("cities.tbl",O_RDONLY | O_BINARY)) > 0) { ctycnt = -1;

do { bytes_read = read(fp,&city,sizeof(city));  /* read count to bytes_read */

20      if (bytes_read) {                              /* if read worked           */ ctycnt++;                                  /* advance counter          */ memmove(&cty[ctycnt],&city,sizeof(city));  /* copy to memory           */
```

```
            }
          } while (bytes_read);                    /*    until end of file */
          close(fp);

5     }
        printf("Loaded %d cities\n",ctycnt);
      } void attachcity(fidsrecord rec)
 10   {
      int match, city_counter;
      if (rec->CityCode1[0]) {      /* if citys then get    */
        match = 0;                                  /*       LSpell   */
        city_counter = -1;
 15     do {
          city_counter++;
          if (!strcmp(rec->CityCode1,cty[city_counter].code)) match = 1;
        } while ((!match) && (city_counter <= ctycnt));
        if (match) {
 20       strcpy(rec->LSpell1,cty[city_counter].big);

}
```

}

}

```
void logwrite(char *a, char *b, int res, int blk)
{
    int fp;
    char name[15];
    char temp1[120];
    sprintf(name,"%s_%s.log","tis",day_of_month);
    if (( fp = open(name,O_BINARY | O_RDWR | O_APPEND)) < 0)
        fp = open(name,O_BINARY | O_RDWR | O_CREAT | O_TRUNC, S_IREAD | S_IWRITE);
    if (fp > 0) {
        lseek(fp,0L,SEEK_END);
        sprintf(temp1,"\n\r[%s]@%s ",a,curtime);
        write(fp,temp1,strlen(temp1));
        sprintf(temp1,"<%s>",b);
        write(fp,temp1,strlen(temp1));
        sprintf(temp1,"<%d>",(res < 0)? res - 0xf000 : res);
        write(fp,temp1,strlen(temp1));
        close(fp);
        return;
    } else {
```

}

} void logstart(void)

While this invention has been described and referenced to illustrative embodiments, the description is not intended to be construed in a limiting sense. Various modifications and combinations of illustrative embodiments as well as other embodiments and inventions will become apparent to those persons skilled in the art upon reference or description. It is, therefore, intended that the pendent claims encompass any such modifications or embodiments.

What is claimed is:

1. A digital signal conversion system for storing, retrieving, and converting real time digital signals to audio signals allowing for subsequent transmission and audio reception, said system comprising:
- at least one airline computerized reservation system serving as digital source computer;
- at least one flight information file server communicably attached to the digital source computer;
- at least one flight information database communicably attached to the flight information file server;
- at least one data output means in communication with the digital source computer;
- at least one local airport local area network communicably attached to the flight information file server;
- at least one signal conversion computer communicably attached to the local airport local area network;
- at least one signal conversion computer database communicably attached to the signal conversion computer;
- an audio production capability in communication with the signal conversion computer;
- a city code differentiation means in communication with the signal conversion computer;
- an announcement generation means resident within the signal conversion computer;
- at least one telephone circuit communicably attached to the signal conversion computer;
- at least one airport location radio transmission local area network in communication with the telephone circuit;
- at least one equalizer communicably attached to airport location radio transmission local area network;
- at least one airport location radio transmitter communicably attached to the equalizer;
- at least one airport location radio antennae communicably attached to the airport location radio transmitter.

2. The digital signal conversion system in accordance with claim 1 where the data output means is a printer.

3. The digital signal conversion system in accordance with claim 1 where the data output means is a monitor.

4. The digital signal conversion system in accordance with claim 1 where the audio production capability data is a personal computer audio plug.

5. The digital signal conversion system in accordance with claim 1 where the city code differentiation means is a personal computer spelling disk.

6. The digital signal conversion system in accordance with claim 1 where the telephone circuit is a dedicated line.

7. The digital signal conversion system in accordance with claim 1 where the telephone circuit is a signal transmission capability within a vertical network.

8. A digital signal conversion system for storing, retrieving, and converting real time digital signals to audio signals allowing for subsequent transmission and audio reception, said system comprising:
- at least one airline computerized reservation system serving as a digital source computer;
- at least one flight information file server communicably attached to the digital source computer;
- at least one digital source data structure to facilitate communication between the digital source computer and a flight information file server;
- at least one flight information database communicably attached to the flight information file server;
- at least one data output means in communication with the digital source computer;
- at least one local airport local area network communicably attached to the flight information file server;
- at least one signal conversion computer communicably attached to the local airport local area network;
- at least one signal conversion computer database communicably attached to the signal conversion computer;
- at least one flight information data structure to facilitate communication between the flight information file server and the signal conversion computer;
- an audio production capability in communication with the signal conversion computer;
- a city code differentiation means in communication with the signal conversion computer;
- an announcement generation means resident within the signal conversion computer;
- at least one telephone circuit communicably attached to the signal conversion computer;
- at least one airport location radio transmission local area network in communication with the telephone circuit;
- at least one equalizer communicably attached to airport location radio transmission local area network;
- at least one airport location radio transmitter communicably attached to the equalizer;
- at least one airport location radio antennae communicably attached to the airport location radio transmitter.

* * * * *